Sept. 15, 1942.  G. A. COMBRIDGE  2,295,546
WELDING ROD HOLDER
Filed Jan. 10, 1941
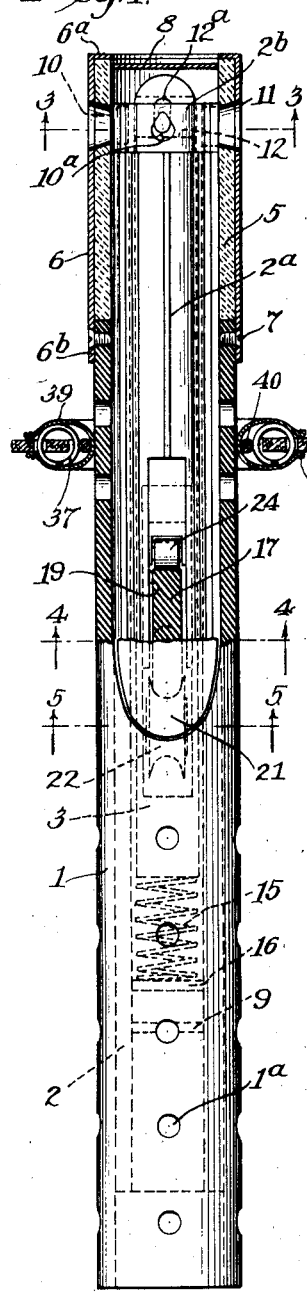
INVENTOR.
George A. Combridge,
BY R. W. Smith

UNITED STATES PATENT OFFICE 2,295,546

WELDING ROD HOLDER

George A. Combridge, Los Angeles, Calif.

Application January 10, 1941, Serial No. 373,888

8 Claims. (Cl. 219—8)

It is the object of this invention to provide a welding rod holder which is efficient in operation and convenient to manipulate.

More particularly it is an object of the invention to provide a holder comprising a tubular electrode and a movable core which cooperate for securely clamping a welding rod or releasing and positively displacing the same.

It is a further object of the invention to provide clamping means which insures good electrical contact between the electrode and the welding rod, with the electrode having high electrical conductivity and adapted for maximum heat dissipation.

It is a still further object of the invention to provide electrical insulation completely enclosing the electrode and the clamping means except at a restricted opening through which the welding rod is inserted.

It is a still further object of the invention to protect the clamping means and the head of the tool against heat of the welding operation.

It is a still further object of the invention to actuate the clamping means by a manual control which is mounted upon the handle convenient to the operator but offering no obstruction to freely dragging the welding rod holder from place to place.

It is a still further object of the invention to provide a shield for the operator which may be readily mounted on or removed from the handle of the tool, and which is readily flexible so that it may be distorted to the shape best meeting the requirements of the particular welding operation.

Further objects of the invention will be readily understood from the following description of the accompanying drawing, in which:

Fig. 1 is a plan view of the welding rod holder, partly in axial section.

Fig. 2 is a side elevation of the tool, partly in axial section.

Figs. 3, 4 and 5 are transverse sections on the lines 3—3, 4—4 and 5—5 respectively of Fig. 1.

The welding rod holder includes a tubular handle 1, a tubular electrode 2 fixed in the handle, a core 3 slidable in the tubular electrode, and means actuated by sliding the core relative to the electrode for clamping a transversely projecting welding rod in the forward end of the electrode or releasing and positively displacing the welding rod.

The electrode 2 has high electrical conductivity and at the same time provides desired rigidity and strength. These desiderata are obtained by the tubular form of the electrode, which insures adequate strength and rigidity when employing an electrode of highly conductive material such as copper, with the tubular form of the electrode also insuring high electrical conductivity and efficient heat dissipation. Heat dissipation is preferably enhanced by providing the outer periphery of the tubular electrode with longitudinal fins 2a.

The tubular handle 1 encloses and provides electrical insulation at the exterior of the electrode 2, and for this purpose is preferably hard rubber and completely surrounds and projects beyond the rear end of the electrode, with its forward end preferably terminating short of the forward end of the electrode for a purpose hereafter described. The tubular handle is preferably provided with radial openings 1a, for venting heat.

The forward end of the tubular electrode (which projects beyond its tubular handle) is preferably enclosed by a medium which electrically insulates the electrode but which has the primary function of protecting the tool against heat of the welding operation. For this purpose a sleeve 5 of fire clay or other heat resisting (and electrical insulating) material surrounds and projects slightly beyond the forward end of the tubular electrode 2. This refractory sleeve is preferably held in place and protected against wear by a metal sheathing 6. The sheathing may be flanged over the forward end of the refractory sleeve as shown at 6a, and at its rear end 6b projects beyond the refractory sleeve for telescopic reception over the forward end of the handle 1, to which it is detachably fixed, e. g., by screws 7.

The forward end of the bore of the sleeve 5 is preferably closed, e. g., by a detachable disc 8, to prevent extraneous matter entering the bore of the tool, particularly in overhead welding operations; and the rear end of the bore of the handle 1 is open, for reception of the electrical cable for the welding rod holder. This cable (not shown) is fixed in the rear end of the bore of the electrode 2, preferably longitudinally abutting a disc 9, and is secured to the electrode 2 in any desired manner (not shown), so as to make good electrical contact.

One end of the welding rod which is to be held by the tool extends laterally through the forward end of the electrode 2 (and through its protective covering 5—6) and is clamped in place by the core 3, with the opposite end of the welding rod projecting laterally from the tool for usual welding operation. The clamping means provides positive and efficient clamping engagement, and insures good electrical contact between the electrode 2 and the welding rod.

As an instance, the forward end of the electrode 2 is preferably a separate annulus 2b which is brazed to the main portion of the tubular electrode, and this annulus is of high electrical conductivity, preferably a copper alloy which is less subject to fusing by the heat of the welding operation than the material used for the main portion of the electrode. The outer periphery of the annulus may be cut away as shown at 2c, for efficient heat dissipation. The annulus is diametrically bored as shown at 10, for reception of a welding rod, and the refractory sleeve 5 and its sheathing 6 are diametrically bored as shown at 11, in alinement with the bores 10.

A second set of bores 10a—11a may be provided in the elements 2b—5—6, preferably at right-angle to the bores 10—11; the two sets of bores being of different diameter for selectively receiving different sizes of welding rod.

The core 3 is diametrically bored at its forward end as shown at 12, in alinement with the bores 10—11; and when the second set of bores 10a—11a are employed the core 3 is also diametrically bored in alinement with the bores 10a—11a as shown at 12a. In cross section the bores 12—12a are slightly elongate longitudinally of the axis of the tool; and in cross-section the bores 10—10a taper toward the forward end of the tubular electrode.

In normal position, the core 3 is projected forwardly so that a welding rod in the bores 10—11 (or 10a—11a) is engaged by the rear end of the elongate bore or slot 12 (or 12a), thereby wedging the welding rod in the tapered forward sides of the bores 10 (or 10a) and thus securely clamping the welding rod in the tubular electrode, with good electrical contact between the electrode and the welding rod. The core 3 may be retracted at the will of the operator, thereby releasing the clamping engagement; and maximum retraction of the core engages the welding rod by the forward end of the slot 12 (or 12a), so as to displace the rod from its wedged engagement in the tapered forward sides of the bores 10 (or 10a) and position the rod adjacent the rear sides of said bores. In this position, the welding rod is free for slight lateral play in the bores 10 (or 10a) so that the stub of a usual welding rod may be readily removed from the tool holder, and a new welding rod may be inserted and then clamped in the tool holder by again projecting the core 3 to its normal position.

The core 3 is yieldably projected by a spring 15 which is mounted in the bore of the electrode 2 between an abutment disc 16 and the rear end of the core; and maximum projection and retraction of the core, for operatively or inoperatively positioning the slots 12 (or 12a), is controlled by a plunger 17 which extends laterally of the handle 1 so as to provide a manual control convenient to the finger of the operator.

As an instance, the core 3 and the electrode 2 have alined transverse slots 18—19, and the plunger 17 is slidable in the slots 18—19, with its lower end forming a guide rod 20 which projects through a bore in the underside of the handle 1, and with its upper end forming a finger-piece 21 which projects through an opening in the upper side of the handle. The plunger 17 and its finger-piece 21 and guide rod 20, are of electrical insulating material.

A roller 22 is journaled in the slot 18 and engages a cam surface 23 at the rear edge of the plunger 17; and a roller 24 is preferably mounted on the electrode 2 and engages a guide surface 25 at the front edge of the plunger. The slot 19 permits sliding movement of the core 3 and its roller 22 without the electrode 2 interfering with this movement; and the core 3 is cut away as shown at 26 so that the roller 24 does not interfere with sliding movement of the core.

Upward projection of the plunger 17 is limited by a pin 28 which projects through the guide rod 20, and depression of the plunger is limited by a shoulder 29 engaging the handle 1. When the finger of the operator is clear of the finger-piece 21, the spring 15 projects the core 3 so that engagement of the roller 22 with the cam surface 23 upwardly projects the plunger 17 to its limit of movement; and when at this upward limit of movement the plunger arrests projection of the core 3 with its slots 12—12a shifted relative to the bores 10—10a for maximum clamping engagement with a welding rod, as shown at Fig. 2. When the finger of the operator engages the finger-piece 21 and depresses the plunger 17, engagement of the cam surface 23 with the roller 22 retracts the core 3 against the tension of the spring 15; and when at its limit of depression the plunger arrests retraction of the core with its slots 12—12a shifted relative to the bores 10—10a for maximum lateral play of a welding rod in one or the other of these pairs of diametrically alined bores.

The upper surface of the finger-piece 21 is preferably curved both longitudinally and transversely of the handle 1. When the plunger 17 is at its upward limit of movement this curved upper surface of the finger-piece projects beyond the handle just far enough for ready engagement by the finger of the operator, with its edges merging into the contour of the handle so as to present no abrupt obstruction such as would prevent the tool being freely dragged from place to place; and when the finger-piece is depressed for shifting the plunger 17 to its lower limit of movement, the finger-piece 21 is retracted within the opening in the handle so that the highest point of its curved upper surface is substantially flush with the outer surface of the handle.

The retaining pin 28 which extends through the guide rod 20 preferably engages a washer 30 which is countersunk in the handle 1; and a shielding washer 31 preferably surrounds the retaining pin and merges into the contour of the handle so as to present no abrupt obstruction such as would prevent the tool being freely dragged from place to place.

A shield for the operator is preferably mounted on the handle 1 in front of the finger-piece 21, and is adapted to be readily mounted in place or as readily removed, and is flexible for distortion to any desired contour. As an instance, the shield is a disc having an axial bore for reception of the handle of the tool, and comprising a plurality of separate sectors 35, which adjacent the outer periphery of the disc are connected by rings 36 at the respective faces of the disc, and which at the periphery of the bore of the disc are connected by a spring 37.

The sectors 35 are of substantially rigid protective material such as a fibrous or rubber composition. The rings 36 are of material, preferably a suitable metal, whereby they may be flexed and then retain their distortion until again flexed by the operator, and the rings may be held in place by rivets 36a which extend through slots in the sectors 35, the slots being preferably elongate circumferentially of the shielding disc so as to permit some relative play of the sectors 35. The spring 37 is a coil-spring, the coils of which are looped through apertures in the sectors 35, with these apertures of a diameter permitting some play of the coil-spring so as to allow some relative play of the sectors 35. The ends of the coil-spring are connected by a fastening clip so that the coil-spring defines a closed annulus adapted for sliding reception over the sheathing 6 and the handle 1 of the tool for yieldably frictionally gripping the handle.

The sectors 35 may lie in a common plane and thus form a flat shield, or the operator may bend the rings 36 and thus relatively displace the sectors 35 so as to provide a shield having any desired concave-convex contour, with the rings 36 and the spring 37 maintaining desired contour of the shield.

A flexible sheathing 39 of asbestos or the like may enclose the spring 37, with a cushioning annulus 40 between the spring and the bore which is defined by the sheathing, and with spring annuli 41 detachably securing the sheathing in place. The invention as thus described provides an efficient and readily manipulated welding rod holder. By pressing the finger-piece 21 the core 3 is retracted so that a welding rod may be readily inserted in the bores 10—11 and the alined slot 12, or a welding rod of different size may be as readily mounted in the bores 10a—11a and the alined slot 12a.

By then releasing the finger-piece 21, the core 3 is spring projected for positively clamping the welding rod in the tapered sides of the bores 10 or 10a. This clamping action is not that of gripping jaws, but is a positive clamping engagement at spaced points along the welding rod, i. e., the welding rod is engaged by the tapered sides of the pair of diametrically opposite bores 10 (or 10a), and the rear end of the slot 12 (or 12a) exerts clamping pressure against the welding rod at a point between this pair of diametrically opposite bores. By again pressing the finger-piece 21 the core 3 is retracted so that the clamping pressure on the welding rod is released and the forward end of the slot 12 (or 12a) shifts the rod from its wedged engagement in the tapered sides of the bores 10 (or 10a), to a position in which it is free for lateral play in said bores, thereby permitting the welding rod stub to drop from the holder, for replacement by a new rod.

When a welding rod is clamped in the holder, the wedging reception of the rod in the tapered sides of the bores 10 (or 10a) insures good electrical contact between the electrode and the welding rod throughout a relatively large area, and the electrode 2—2b provides an integral electrical connection between the power cable and this electrical contact, with the electrode of annular cross-section and highly conductive material for maximum electrical conductivity. Maximum efficiency in transfer of electrical energy from the power cable via the tool to the welding rod is thus assured. The tubular form of the electrode 2 also insures efficient heat dissipation, and provides desired rigidity and strength for the tool.

The head of the tool is protected against heat of the welding operation by the refractory sleeve 5; and the entire tool is exteriorly insulated so that it may be freely handled and contacted with any surface without electrically grounding and short-circuiting the tool. The absence of abrupt projections at the exterior of the tool, with the finger-piece 21 projecting but slightly beyond and merging with the contour of the exterior of the handle, also adapts the tool for convenient handling in that it may be dragged from place to place without danger of its being caught and held-up by obstacles such as are liable to be encountered where welding operations are being carried on.

I claim:

1. In a welding rod holder, a handle, a tubular electrode in the handle, a core slidable in the tubular electrode, means actuated by sliding the core for releasably clamping a welding rod in the electrode, the core and the electrode and the handle having alined transverse slots, a plunger slidable transversely of the handle in said slots, a roller in the slot in the core having cam engagement with the plunger, anti-frictional means in the slot in the electrode having guiding engagement with the plunger, a spring tending to slidably project the core, and a finger-piece at the outer end of the plunger for sliding it inwardly, the cam engagement sliding the plunger outwardly responsive to sliding projection of the core and slidably retracting the core responsive to sliding the plunger inwardly, and the finger-piece being slidable in the slot in the handle and having an outer surface which when the plunger is shifted outwardly is just accessible from the exterior of the handle and merges at its entire margin into the outer surface of the handle.

2. In a welding rod holder, a handle, an electrode, a slidable core, means actuated by sliding the core for releasably clamping a welding rod in the electrode, the core and the handle having alined slots, a plunger shiftable transversely of the handle in said slots, the plunger having cam engagement with the core, a spring tending to slidably project the core, and a finger-piece at the outer end of the plunger for shifting it inwardly, the cam engagement shifting the plunger outwardly responsive to sliding projection of the core and slidably retracting the core responsive to shifting the plunger inwardly.

3. In a welding rod holder, a handle, an electrode, means for detachably clamping a welding rod in the electrode, the handle having a transverse slot, a plunger slidable transversely of the handle in said slot, an operating connection between the plunger and the clamping means, a spring tending to slide the plunger outwardly for shifting the clamping means to clamping position, and a finger-piece at the outer end of the plunger for sliding it inwardly for shifting the clamping means to releasing position.

4. In a welding rod holder, a handle, an electrode, means for detachably clamping a welding rod in the electrode, the handle having a transverse slot, a plunger slidable transversely of the handle in said slot, an operating connection between the plunger and the clamping means, a spring tending to slide the plunger outwardly for shifting the clamping means to clamping position, and a finger-piece at the outer end of the plunger for sliding it inwardly for shifting the clamping means to releasing position, the finger-piece being slidable in the slot in the handle and having an outer surface which when the plunger is shifted outwardly is just accessible from the exterior of the handle and merges at its entire margin into the outer surface of the handle.

5. In a welding rod holder, a handle, an electrode, means for detachably clamping a welding rod in the electrode, the handle having a transverse slot, a plunger slidable transversely of the handle in said slot for controlling clamping and release of the clamping means, and a finger-piece at the outer end of the plunger for sliding it inwardly, the finger-piece being slidable in the slot in the handle and having an outer surface which when the plunger is shifted outwardly is just accessible from the exterior of the handle and merges at its entire margin into the outer surface of the handle.

6. In a welding rod holder, a handle, an electrode, means for detachably clamping a welding rod in the electrode, the handle having a transverse slot, a plunger slidable transversely of the handle, an operating connection between the plunger and the clamping means, a spring tending to slide the plunger transversely of the handle in one direction for shifting the clamping means to clamping position, and a finger-piece at the outer end of the plunger for sliding it transversely of the handle in the opposite direction for shifting the clamping means to releasing position, the finger-piece being shiftable in the transverse slot and having an outer surface accessible from the exterior of the side of the handle without obstruction-forming outward projection beyond the surface of the handle.

7. In a welding rod holder, a handle, an electrode, a core slidable longitudinally in the electrode, means actuated by sliding the core for releasably clamping a welding rod in the electrode, the handle having a transverse slot, a plunger shiftable transversely of the handle in said slot, a roller on the core having cam engagement with the plunger, a spring tending to slidably project the core, and a finger-piece at the outer end of the plunger, the cam engagement shifting the plunger outwardly responsive to sliding projection of the core and slidably retracting the core responsive to shifting the plunger inwardly, and the finger-piece being shiftable in the slot in the handle and having an outer surface which when the plunger is shifted outwardly is just accessible from the exterior of the handle and merges at its entire margin into the outer surface of the handle without obstruction-forming outward projection therebeyond.

8. In a welding rod holder, a handle, an electrode, a core slidable longitudinally in the electrode, means actuated by sliding the core for releasably clamping a welding rod in the electrode, the handle having a transverse slot, a plunger shiftable transversely of the handle in said slot, the plunger having cam engagement with the core, a spring tending to slidably project the core, and a finger-piece at the outer end of the plunger, the cam engagement shifting the plunger outwardly responsive to sliding projection of the core and slidably retracting the core responsive to shifting the plunger inwardly, and the finger-piece being shiftable in the slot in the handle and having an outer surface which when the plunger is shifted outwardly is just accessible from the exterior of the handle.

GEORGE A. COMBRIDGE.